(12) United States Patent
Roudeau et al.

(10) Patent No.: US 7,937,201 B2
(45) Date of Patent: May 3, 2011

(54) METHOD FOR PRODUCING A CONTROL INSTRUCTION ADAPTABLE TO A BRAKE SITUATION FOR A TRANSMISSION DEVICE OF A MOTOR VEHICLE POWER TRAIN AND CORRESPONDING DEVICE

(75) Inventors: Frédéric Roudeau, Vitry sur Seine (FR); Jean Bretheau, Antony (FR); Vincent Vermuse, St German les Arpajons (FR)

(73) Assignee: Renault s.a.s., Boulogne Billancourt (FR)

( * ) Notice: Subject to any disclaimer, the term of this patent is extended or adjusted under 35 U.S.C. 154(b) by 858 days.

(21) Appl. No.: 11/575,071

(22) PCT Filed: Sep. 5, 2005

(86) PCT No.: PCT/FR2005/050710
§ 371 (c)(1),
(2), (4) Date: Oct. 26, 2007

(87) PCT Pub. No.: WO2006/030144
PCT Pub. Date: Mar. 23, 2006

(65) Prior Publication Data
US 2008/0177452 A1    Jul. 24, 2008

(30) Foreign Application Priority Data

Sep. 10, 2004 (FR) .................................. 04 09645

(51) Int. Cl.
*B60T 8/00* (2006.01)
(52) U.S. Cl. ............... 701/51; 701/54; 701/58; 701/87; 477/15; 477/73; 477/115

(58) Field of Classification Search .................... 701/51, 701/53, 54, 58, 59, 70, 75, 79, 83, 84, 87; 477/9, 15, 34, 71, 73, 92, 94, 107, 115, 120, 477/182–187; 475/118, 125, 126, 254, 257; 303/112, 121, 138, 155
See application file for complete search history.

(56) References Cited

U.S. PATENT DOCUMENTS

| | | | | |
|---|---|---|---|---|
| 4,720,793 | A * | 1/1988 | Watanabe et al. | 701/54 |
| 6,287,237 | B1 * | 9/2001 | Graf et al. | 477/94 |
| 6,507,780 | B2 * | 1/2003 | Graf | 701/51 |
| 7,130,737 | B2 * | 10/2006 | Biester et al. | 701/110 |
| 2001/0027372 | A1 * | 10/2001 | Hellmann et al. | 701/96 |
| 2003/0109979 | A1 * | 6/2003 | Schuster et al. | 701/70 |

FOREIGN PATENT DOCUMENTS

| | | |
|---|---|---|
| EP | 1 275 551 A1 | 1/2003 |
| FR | 2 834 939 | 7/2003 |

* cited by examiner

*Primary Examiner* — Thomas G Black
*Assistant Examiner* — Ce Li
(74) *Attorney, Agent, or Firm* — Oblon, Spivak, McClelland, Maier & Neustadt, L.L.P.

(57) ABSTRACT

A device delivers a torque setpoint signal applicable to the vehicle wheels of a motor vehicle including an automatic transmission. The torque setpoint signal has static and dynamic components that are set according to input data supplied by an input unit and based on a recorded list of parameters representing the driver's will, the motor vehicle state, and the environment thereof. The device includes a first unit for computing the dynamic component of a gross torque, a second unit for computing the static component of a gross torque, the second unit being connected to the output of the first unit, and a unit for adaptation to a brake situation producing the static component of the torque adapted to the braking situation according to the list of parameters.

15 Claims, 3 Drawing Sheets

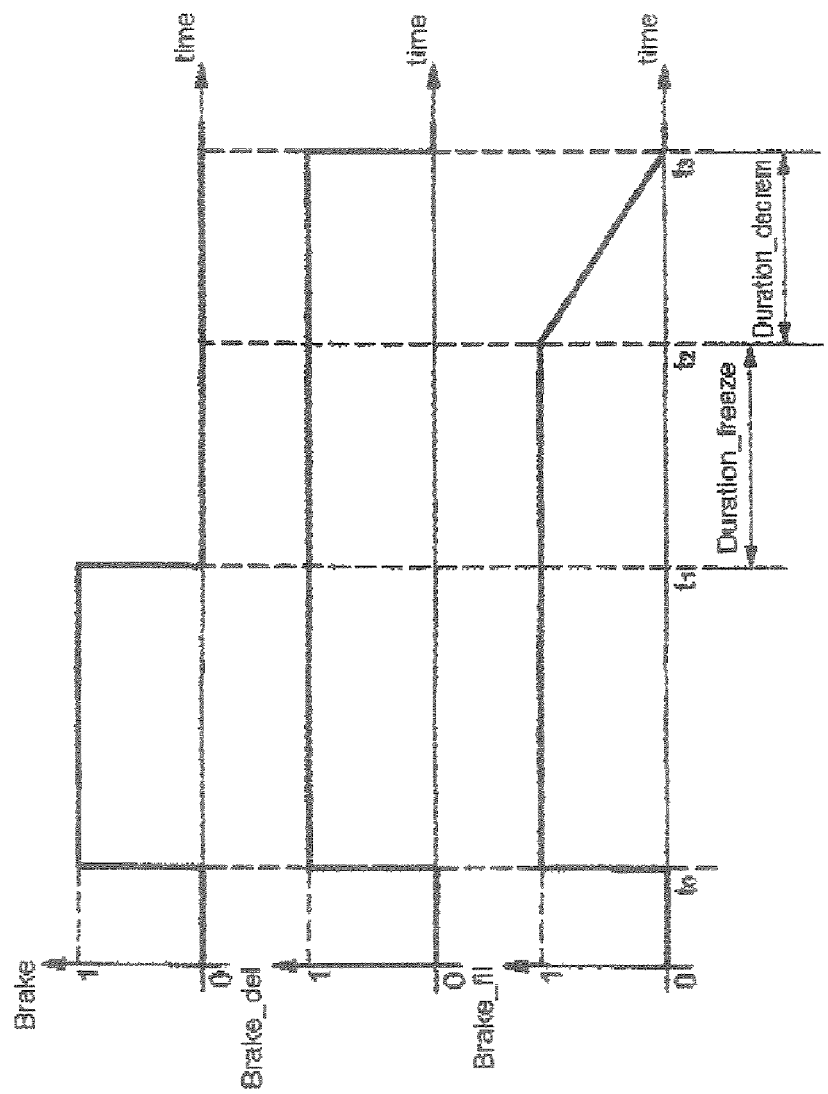

METHOD FOR PRODUCING A CONTROL INSTRUCTION ADAPTABLE TO A BRAKE SITUATION FOR A TRANSMISSION DEVICE OF A MOTOR VEHICLE POWER TRAIN AND CORRESPONDING DEVICE

BACKGROUND

The present invention relates to a method of controlling a transmission device of a motor vehicle power train in a situation termed braking. It also relates to a device implementing such a control method.

This method applies advantageously to automated transmission devices in particular Impulse Control Boxes termed BCI, Automatic Control Boxes termed BVA and Robotized Gear Boxes termed BVP, but also continuous-ratio transmissions, such as CVT ("Continuous Variable Transmission"), IVT ("Infinitely Variable Transmission") and hybrid transmissions.

A motor vehicle automated transmission conventionally comprises a control block receiving one or more input parameters interpreting inter alia, the desire of the driver. Then, as a function of the value of these parameters, the control block delivers a control setpoint with a view to an application to the wheels of the motor vehicle.

An upgrade of such a control block has already been described in document FR-A-2827339, in the name of the Applicant. This document details a device for controlling the operating point of a power train. The control carried out by this device is a torque control applied to the wheels of the motor vehicle. As defined in document FR-A-2827339, the value of the torque to be applied to the wheels of the motor vehicle is calculated directly at the wheels of the motor vehicle.

The device of document FR-A-2827339 possesses a module for interpreting the desire of the driver called an IVC module.

The IVC module generates a torque setpoint to be applied to the wheels, destined for a block for optimization of the operating point OPF. The latter transmits said torque with a view to a torque control applied to the wheels of the motor vehicle. The OPF block simultaneously generates an engine revs setpoint on the basis of said torque applied to the wheels of the motor vehicle. This torque setpoint to be applied to the wheels of the motor vehicle is determined as a function of the desire of the driver, of the characteristics of the motor vehicle and of its environment, so as to best adapt the behavior of the motor vehicle, according to the driving situations.

In a braking situation, that is to say during the activation of the brake pedal of the motor vehicle, it is indispensable to adapt the torque setpoint applicable to the wheels of the motor vehicle, in such a way as to offer the driver optimal driving comfort as well as command of the acoustics of the power train. This adaptation must be performed during the braking phase but also during reacceleration, after said braking phase.

For example, for a motor vehicle equipped with an automatic transmission, in order to actuate the brake pedal, the driver must ease off the accelerator pedal. The automatic gearbox which was previously in a given gear, then shifts directly to the gear above on account of the conventional shifting laws of an automatic gearbox. It thus deprives the motor vehicle of engine brake. The shift to the gear above then causes an unpleasant sensation of boarding of the motor vehicle. In order to cause the shift to the lower gear, the driver must depress the accelerator pedal to the maximum, to benefit from the downshift function with a view to a reacceleration, termed the "kick-down" function.

A method is known in the prior art through document U.S. Pat. No. 5,514,051 filed by Porsche, said method consisting in adjusting driving parameters of the motor vehicle as a function of predefined parameters corresponding to a normal driving situation. When the motor vehicle is in a particular state, a braking state for example, a computer detects the deviation with respect to the normal driving situation and adjusts the driving parameters accordingly. This method is intended for motor vehicles equipped with an automatic transmission.

A method making it possible to maintain engine brake before reacceleration within the framework of motor vehicles equipped with a continuous variation gearbox termed a CVT box is likewise known through the document EP 0 280 757. A device allows a downshift of the transmission to be blocked so as to benefit from additional engine brake.

In document. FR-2 765 652 in the name of the applicant, it is proposed to produce a device for controlling downshifts in a braking situation for motor vehicles possessing a stepped-ratio transmission. This control makes it possible to shift directly to a lower gear if a particular operating regime is detected, a braking situation for example, then locks this lower gear as long as the particular regime is detected.

Finally, a device which makes it possible to preposition the operating point of the power train in a braking situation for example is known through the document FR-2 834 939 in the name of the applicant. One thus obtains a torque reserve allowing reacceleration out of the braking phase. The control setpoint is calculated as an engine torque.

BRIEF SUMMARY

The present invention is aimed at remedying the aforesaid drawbacks. The principle of the invention consists in envisaging an adaptation of the torque setpoint to be applied to the wheels of the motor vehicle so as to improve the behavior of the motor vehicle in a braking situation. The invention furthermore envisages a torque reserve applicable to the wheels of the motor vehicle to help it pick up again after each braking phase. This adaptation is directly applicable to the torque calculated at the wheel, as defined previously, thereby allowing greater accuracy as regards the corrections made.

Furthermore, the adaptation proposed by the invention is capable of operating with any type of transmission.

For this purpose, the invention proposes a method of controlling an automated transmission of a power train for a motor vehicle. It comprises a step of formulating a torque setpoint to be applied to the wheel, composed of two components, static and dynamic, formulated as a function of input data representative of the characteristics of the motor vehicle, of the desire of the driver and of the environment of the motor vehicle. The static component of torque applicable to the wheels of the motor vehicle forms the subject of an adaptation in the braking phase and beyond said braking phase, as a function of a list of predetermined parameters, said adaptation is the braking phase comprising the following steps:
  produce a dynamic component of raw torque representative of the desire of the driver as a function of predetermined input parameters, then correct it to obtain a dynamic torque component,
  determine a static component of raw torque on the basis of said dynamic torque component,
  calculate a static torque component adapted to a braking situation, as a function of said static component of raw torque.

This method makes it possible to generate a torque setpoint at the wheels, adapted to a braking situation and beyond said braking phase. The proposed solution allows the motor vehicle to have available a sufficient torque reserve to allow acceleration to pick up at the end of the braking phase. Furthermore, this method confers greater engine brake on the motor vehicle in a braking situation and thus spares the passengers from the sensation of boarding.

Preferably, said static torque component adapted to a braking situation is integrated with additional corrections, dependent on the braking phase considered, so as to deliver a static component of optimal torque.

According to one mode of implementation, it is possible to adapt the setpoint in the braking phase and beyond the braking phase as a function of the deceleration of the motor vehicle.

According to one mode of implementation, it is possible to adapt the setpoint in the braking phase and beyond the braking phase as a function of the speed of the motor vehicle.

According to one mode of implementation, it is possible to adapt the setpoint in the braking phase and beyond the braking phase as a function of the instantaneous maximum torque applicable to the wheels of the motor vehicle.

According to one mode of implementation, it is possible to adapt the setpoint in the braking phase and beyond as a function of a signal representing the position of the brake pedal of the motor vehicle.

According to a preferred mode of implementation, the step of calculating a static torque component adapted to a braking situation advantageously comprises the following steps:
  construct a first step signal intended to maintain the correction in the braking phase, and a second signal intended to progressively attenuate the correction in the braking phase,
  compare and integrate said second signal with a list of predetermined input parameters comprising the static component of raw torque, the instantaneous maximum torque applied to the wheel, the speed of the motor vehicle and the deceleration of the motor vehicle.

The invention is also aimed at a device for controlling an automated transmission of a power train for a motor vehicle able to deliver a torque setpoint signal to be applied to the wheels of the motor vehicle comprising two components, static and dynamic, formulated as a function of input data delivered by an input block, said input data comprising a recorded list of parameters representative of the desire of the driver, of the state of the motor vehicle and of the environment of the motor vehicle. The device comprises:
  a first block able to calculate a dynamic torque component without adaptation to a braking situation,
  a second block able to calculate a static component of raw torque, said second block being connected to the output of said first block,
  a block for adaptation to the braking situation delivering a static torque component adapted to the braking situation as a function of a list of predetermined input parameters.

According to one embodiment, the device can comprise means able to make additional corrections to said dynamic component of raw torque and to said static component of raw torque.

According to one embodiment, the control device may advantageously comprise means able to integrate the static torque component adapted to a braking situation with additional corrections dependent on the driving phase considered.

The list of predetermined parameters of the block for adaptation to the braking situation advantageously comprises signals representing the static component of raw torque, the instantaneous maximum torque applicable to the wheels of the motor vehicle, the speed of the motor vehicle, the deceleration of the motor vehicle and signals representing the brake pedal of the motor vehicle.

According to one embodiment, the block for adaptation to the braking situation of the static component of raw torque can comprise:
  a module able to construct a first step signal intended to maintain the correction in the braking phase, and a second signal intended to progressively attenuate the correction beyond the braking phase,
  means able to store a first mapping so as to deliver a weighting setpoint as a function of the speed of the motor vehicle,
  means able to store a second mapping so as to calculate a percentage of the deviation between the instantaneous maximum torque applicable to the wheels of the motor vehicle and the static component of raw torque, as a function of the deceleration of the motor vehicle,
  means for comparing and for integrating said second signal intended to progressively attenuate the correction in the braking phase, with signals representing the raw static torque component, the instantaneous maximum torque applicable to the wheels of the motor vehicle, the speed of the motor vehicle and the deceleration of the motor vehicle.

BRIEF DESCRIPTION OF THE DRAWINGS

Other advantages and characteristics of the invention will appear on examining the detailed description of a wholly nonlimiting embodiment of the invention, and one appended drawings, in which:

FIG. 3 illustrates an example of the signals delivered by a block of the diagram represented in FIG. 2.

DETAILED DESCRIPTION

Figure 1:
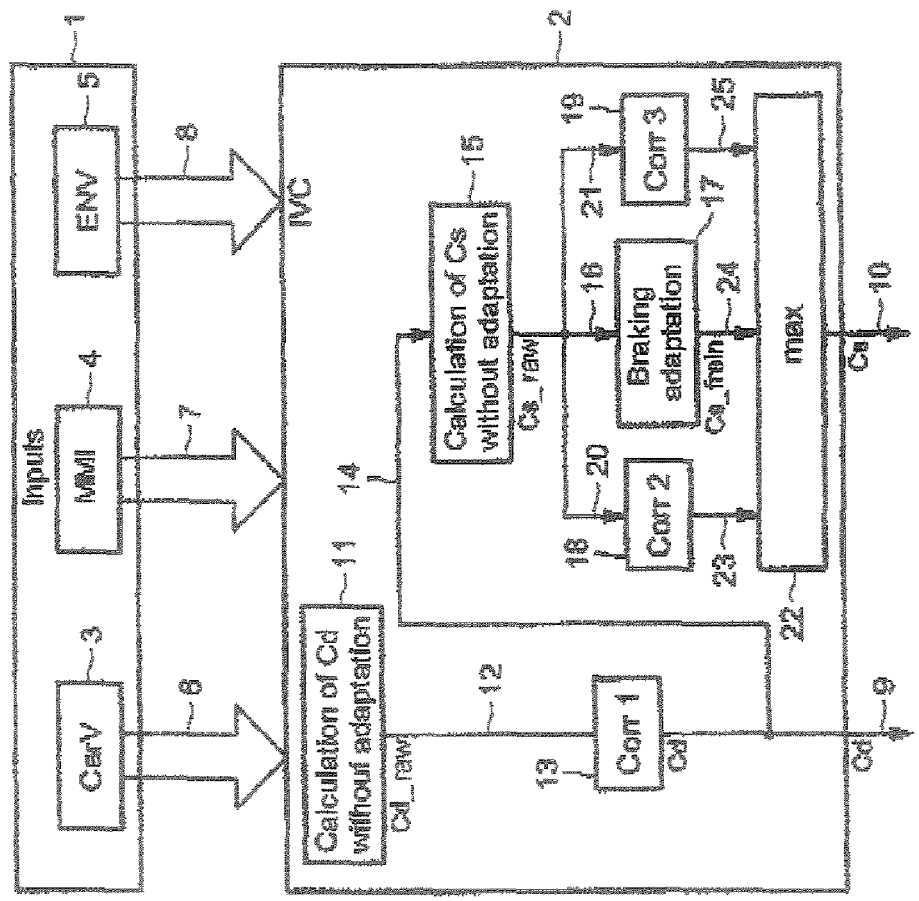
FIG. 1 is a schematic diagram of an exemplary embodiment of an IVC module integrating the adaptation of the setpoint in the braking phase.

We refer to FIG. 1. Represented in this figure is the integration of the device for adaptation of the torque setpoint to be applied to the wheels of the motor vehicle in the braking phase, into the automated transmission of the motor vehicle (not represented).

This device comprises two blocks 1 and 2, respectively an inputs block 1 and an IVC module 2.

The function of the input block 1 is to deliver the input parameters to the module 2 for the adjustment of the torque setpoint to be applied to the wheels of the motor vehicle, in the braking phase. The block 1 receives as input signals delivered by sensors (not represented) integrated with the motor vehicle.

These input data, transmitted to the module 2 by the block 1, can be delivered respectively to each functional block included in this module 2.

The input block 1 comprises three modules 3, 4 and 5. Each of these three modules delivers a predetermined type of input data to the module 2.

A first module 3 denoted CarV is capable of formulating the data relating to the characteristics of the motor vehicle. These are programmed and stored in a memory common to the device (not represented). These data are defined by the constructor of the motor vehicle so as to characterize the behavior of the motor vehicle.

A second module 4 denoted MMI (man/machine interface) is capable of formulating data relating to the desire of the driver. These data interpret the wishes of the driver. They can for example comprise signals representative of the brake or accelerator pedal of the motor vehicle or else a signal interpreting the sportiness of the driver.

A third module denoted 5 ENV is capable of formulating signals relating to the environment of the motor vehicle. These make it possible to take account of the state of the motor vehicle and of its situation in the environment. They comprise for example signals corresponding to the engine revs of the motor vehicle, to the speed of the motor vehicle, or else to the current deceleration of the motor vehicle, particularly in a braking situation.

The signals delivered by the three modules 3, 4 and 5 are formulated on the basis of signals originating from sensors (not represented) integrated with the motor vehicle.

These three modules 3, 4 and 5 are respectively connected to the IVC module 2 by way of the connections 6, 7 and 8.

The IVC module 2, described in document FR-A-2 827 339, in the name of the Applicant, represents a block able to generate a torque setpoint to be applied to the wheels of the motor vehicle by interpreting the desire of the driver.

The module 2 receives as input the input parameters formulated by the block 1 and delivers as output the dynamic Cd (or dynamic torque setpoint) and static Cs (or static torque setpoint) components of the torque setpoint to be applied to the wheels of the motor vehicle. The two setpoints are respectively transmitted by way of the connections 9 and 10. The setpoints Cd and Cs supply an optimization module OPF, described in document FR-A-2 827 339, making it possible to determine the optimal engine revs of the thermal engine of the power train.

The dynamic torque setpoint Cd is the value of the torque that the driver wishes to see achieved instantaneously. The static torque setpoint Cs is defined as the target dynamic torque that the driver could demand and that the power train should render immediately available at the wheels of the motor vehicle. The setpoint Cs evolves slowly. Specifically, it is not aimed at meeting an immediate demand of the driver. It has to be the reflection of a tendency imposed by the behavior of the driver over a predetermined period. Stated otherwise, the torque Cs corresponds to the torque value applicable to the wheels of the motor vehicle that the driver would wish to obtain by reloading the accelerator pedal of the motor vehicle.

According to the invention, the module 2 comprises three functional blocks 11, 15 and 17.

The first functional block is a block 11 (Calculation of Cd without adaptation) able to calculate a dynamic torque setpoint without adaptation denoted Cd_raw. This Cd_raw setpoint is calculated in particular on the basis of the signals representative of the position of the accelerator pedal of the motor vehicle, of the revs of the engine of the motor vehicle and of the speed of the motor vehicle, these signals being delivered by the input block 1. Conventionally, when moving forward, the torque Cd takes a negative value in order to decelerate the motor vehicle.

The Cd_raw setpoint can undergo additional corrections, for example an adaptation of the setpoint in a slope situation. For this purpose, the Cd_raw setpoint is transmitted by way of the connection 12 to a corrective block 13 denoted Corr1, which delivers the setpoint Cd as output.

The second functional block is a block 15 (Calculation of Cs without adaptation) which is capable of calculating a Cs_raw static torque setpoint without particular adaptation. The Cs_raw setpoint is constructed on the basis of the dynamic torque Cd, arising from the corrective block 13 and transmitted via the connection 14. Furthermore, the Cs_raw setpoint is calculated as a function of parameters such as the sportiness of the driver for example; this parameter can be calculated on the basis of the signal representative of the position of the accelerator pedal of the motor vehicle, delivered by the input block 1.

The Cs_raw setpoint is delivered, by way of the connection 16, to the third functional block 17 integrated with the module 2, which is the block for adapting to a braking situation. The function of the block 17 (Braking adaptation) is to formulate, on the basis of the Cs_raw setpoint, a torque setpoint applicable to the wheels of the motor vehicle, adapted to the braking situation Cs_broke. In the case where the vehicle is moving forward, the Cs_raw setpoint is positive. The setpoint Cs_brake delivered by the block 17 affords the possibility of improving the operating point of the drive train of the motor vehicle. Specifically, the operating point will make it possible to preset the value of the thermal engine revs, to a value anticipating the desire of the driver. The block 17 will be described in greater detail hereafter.

In parallel with the adaptation to the braking situation, the Cs_raw setpoint can undergo other corrections, for example in a cornering or slope situation. These additional corrections are performed respectively by the two corrective blocks 18 Corr2 and 19 Corr3. The Cs_raw setpoint is transmitted to the blocks 18 and 19 by the respective connections 20 and 21.

The three blocks 17, 18 and 19 deliver their output setpoints to the block 22 denoted max. The block 18 delivers its setpoint to the block 22 via a connection 23, the block 17 via a connection 24 and the block 19 via a connection 25.

The block 22, placed at the output of the blocks 17, 18 and 19, arbitrates the various corrections effected by these three blocks. Specifically, the setpoint Cs can comprise at one and the same time an adaptation for braking and an adaptation for cornering for example. The block 22 then delivers as output an output setpoint Cs integrating the various corrections made.

Figure 2:
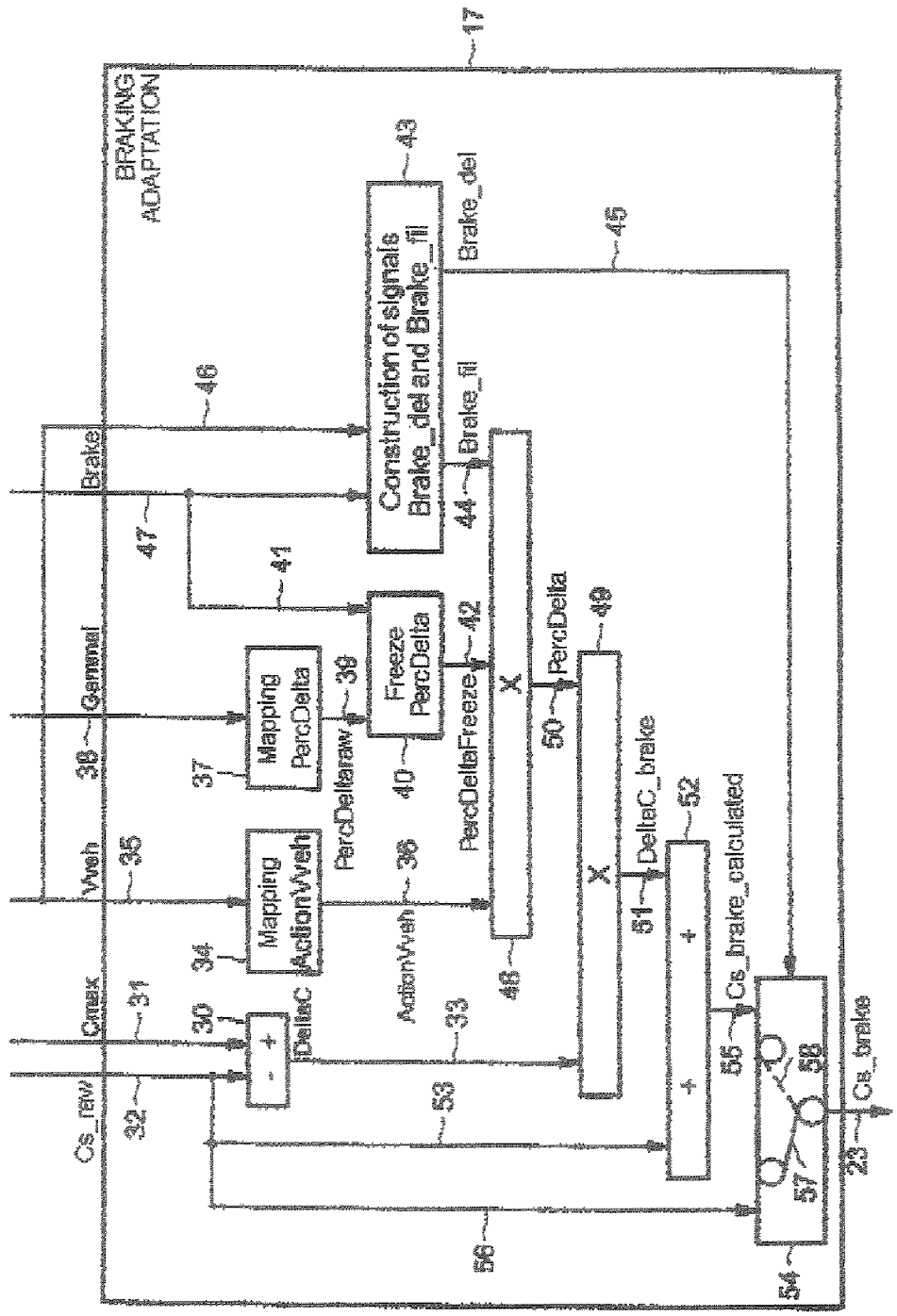
FIG. 2 represents more precisely an exemplary embodiment of a detail of the diagram of FIG. 1.

FIG. 2 is now referred to. This figure details the block 17 carrying out the adaptation of the Cs_raw setpoint in the braking phase.

The block 17 receives various input parameters such as the speed of the motor vehicle denoted Vveh, the signal representing the brake pedal denoted Brake, and the current deceleration denoted Gamma1. The current deceleration of the motor vehicle can be measured by an accelerometer integrated with the motor vehicle, but also calculated on the basis of the speed of the motor vehicle. All these input parameters originate from the input block 1, represented in FIG. 1, and delivered to the various blocks included in the module 2.

The block 17 also receives Cs_raw arising from the block 15 (Calculation of Cs without adaptation), as well as the component Cmax which is the maximum torque applicable to the wheels of the motor vehicle, that the power train can provide to the wheels of the motor vehicle. This component Cmax is produced with the aid of a recorded table (not represented) which is addressed, in a preferred embodiment, as a function of the rotation speed measured at the wheel of the motor vehicle. The value Cmax therefore evolves dynamically as a function of the speed of the motor vehicle.

The block 17 comprises several functional blocks allowing the construction of the setpoint Cs_brake.

Firstly, the block 17 comprises a subtracter 30, whose role is to effect the difference between the component Cmax, delivered by way of the connection 31, and the Cs_raw setpoint delivered via the connection 32. The difference, denoted DeltaC, is delivered as output of the subtracter 30 by way of a connection 33.

A mapping 34 (Mapp ActionVveh) is placed parallel to the subtracter 30, and receives as input the speed of the motor vehicle Vveh via a connection 35. The mapping 34 formulates a weighting denoted ActionVveh, taking values between "0" and "1" and delivered via the connection 36. The mapping 34 is activated, that is to say that the values of ActionVveh are strictly less than "1", only when the speed of the motor vehicle is less than a predetermined threshold. The signal ActionVveh makes it possible to cancel the correction in the braking phase above an adapted threshold, determined by the mapping 34. The signal ActionVveh then ensures progressive disappearance of the filtering as a function of the variation of the speed of the motor vehicle.

A second mapping 37 (Mapp PercDelta) situated parallel to the block 30 receives as input, via a connection 38, a current deceleration value denoted Gamma1. The mapping 37 delivers as output, via the connection 39, a variable denoted PercDeltaraw. This variable is a raw percentage of the deviation between the Cs_raw setpoint and the component C_max. This deviation between the Cs_raw setpoint and the component C_max is the variable DeltaC, which has been calculated by the block 30.

A block 40 (FreezePercDelta) situated at the output of the block 37 has the function of updating the percentage PercDeltaraw in the braking period or to freeze it outside of the braking period. To do this, the block 40 receives as input the variable PercDeltaraw via the connection 39 and the signal representative of the position of the brake pedal, Brake, via a connection 41. The block 40 delivers as output a variable denoted PercDeltaFreeze via a connection 42, this variable PercDeltaFreeze representing the percentage PercDeltaraw frozen or updated.

A block 43 (construction of the signals Brake_del and Brake_fil) constructs two signals Brake_fil transmitted as output via a connection 44 and Brake_del transmitted as output via a connection 45. These two signals Brake_fil and Brake_del are constructed on the basis of the speed of the motor vehicle Vveh, transmitted via a connection 46 and the signal representative of the position of the brake pedal of the motor vehicle, transmitted via a connection 47.

The variation of the two signals Brake_fil and Brake_del is represented in FIG. 3 as a function of time. It is considered that the signal Brake is a step taking the value "1" between t0 and t1 (the brake pedal is activated) and "0" otherwise (the brake pedal is inactivated). The signal Brake_del makes it possible to keep the correction between t1 and t3, i.e. for a total duration equal to Duration_freeze+Duration_decrem, after the disappearance of the signal Brake at t1. The signal Brake_fil makes it possible for its part, to progressively weaken the effect of the correction. Thus, the signal Brake_fil takes the value "1" at t0 until t2 then decreases progressively, for example in the form of a linear ramp, between t2 and t3, i.e. for a duration Duration_decrem. The two variables Duration_freeze and Duration_decrem are two variables calibratable by the constructor. They can represent a duration, as in the example of FIG. 3, or a distance traversed by the motor vehicle (by integrating the speed of the motor vehicle).

FIG. 2 is referred to again. The signal Brake_fil is transmitted to a first multiplier 48 via the connection 44. The multiplier 48 is situated at the output of the block 43. It receives the signals ActionVveh and PercDeltaFreeze respectively via the connections 36 and 42. The signal PercDelta resulting from the multiplication of the three input signals, Brake_fil, ActionVveh and PercDeltaFreeze, represents the percentage of the variation in torque to be applied to the wheels of the motor vehicle that one actually wishes to apply.

A second multiplier 49 is placed at the output of the first multiplier 48. The multiplier 49 receives the variable PercDelta calculated previously and transmitted via a connection 50. The multiplier 49 receives, via the connection 33, the variable DeltaC delivered, by the block 30. By multiplying the two variables PercDelta and DeltaC, the multiplier 49 delivers as output, via a connection 51, the signal DeltaC_brake which represents the additional torque quantity (as an algebraic value) applicable to the wheels of the motor vehicle, that one wants to be able to apply in the braking phase and beyond.

An adder 52 situated at the output of the multiplier 49 receives as input the aforesaid variable DeltaC_brake, via the connection 51, as well as the torque Cs_raw, via a connection 53. The sum of the two signals DeltaC_brake and Cs_raw results in the setpoint Cs_brake_calculated, which is the static torque intended to be applied to the wheels of the motor vehicle in the braking phase and beyond.

A selector 54 is placed at the output of the adder 52. The multiplexer 54 receives as input the setpoint Cs_brake_calculated, transmitted via a connection 55, and the torque setpoint Cs_raw transmitted via a connection 56. The selector 54 also receives a control signal which is the signal Brake_del formulated by the block 43, transmitted via the connection 45. As a function of the control signal Brake_del, the selector 54 is able to deliver an output signal corresponding to one or the other of these input signals.

As a function of the value of Brake_del, the selector 54 is one of the configurations represented in FIG. 2. If "Brake_del=0", the correction in the braking phase is not applied. The selector 54 establishes a connection between the input where the Cs_raw signal is transmitted and its output terminal so as to deliver the Cs_raw setpoint as output. If "Cor_del=0", the motor vehicle is in a second configuration where the driver actuates or has just actuated the brake pedal. The torque setpoint to be applied to the wheels comprising the correction calculated for a braking situation is then delivered. The selector 54 establishes a connection 58 between the input where the signal Cs_brake_calculated is transmitted and its output, so as to deliver the setpoint Cs_brake_calculated as output. The latter is applied so long as the control signal Brake_del is equal to "1".

The static component Cs of torque thus increased, by the component Delta_C_brake, in a braking situation and beyond affords several advantages. It makes it possible to preset the power train on an operating point, thus offering a greater torque reserve applicable to the motor vehicle wheel, thereby allowing the motor vehicle to accelerate more rapidly after the braking phase if required. Specifically, to obtain the torque reserve applicable to the motor vehicle wheel, the power train is positioned on an engine revs operating point formulated as a function of the torque setpoint to be applied to the motor vehicle wheel) that is greater than it would have been without this increased demand. This results in an acoustic effect known to the driver during downshifts in the braking phase and above all, this prevents the engine revs from descending rapidly to low values in the braking phase, to which the driver is not accustomed.

The invention claimed is:

1. A method of delivering a torque setpoint signal to be applied to a wheel of a motor vehicle including an automated transmission, comprising:

formulating the torque setpoint signal to be applied to the wheel of the motor vehicle, the torque setpoint signal including a static component and a dynamic component, formulated as a function of input data representative of characteristics of the motor vehicle, of a desire of a driver, and of an environment of the motor vehicle, wherein the static component of torque applicable to the wheel of the motor vehicle forms a subject of an adaptation in a braking phase, the braking phase including a period during which a brake is applied by the driver and an additional period beyond the period during which the brake is applied, as a function of a list of predetermined input parameters, the adaptation in the braking phase comprising:

producing a dynamic component of raw torque representative of the desire of the driver as a function of predetermined input parameters, then correcting the dynamic component of raw torque to obtain a dynamic torque component, determining a static component of raw torque based on the dynamic torque component, and calculating a static torque component adapted to a braking situation, as a function of the static component of raw torque, the calculating comprising constructing a first step signal configured to maintain a correction in the braking phase, and a second signal configured to progressively attenuate the correction in the braking phase, and comparing and integrating the second signal with the list of predetermined input parameters, which includes the static component of raw torque, instantaneous maximum torque applicable to the wheel, speed of the motor vehicle, and deceleration of the motor vehicle; and transmitting the torque setpoint signal to an optimization module to control the automated transmission.

2. The method as claimed in claim 1, wherein the second signal progressively attenuates the correction in the additional period of the braking phase beyond the period during which the brake is applied.

3. The method as claimed in claim 1, wherein the progressive attenuation of the second signal is linear.

4. The method as claimed in claim 1, wherein the additional period of the braking phase includes a freeze period after the period during which the brake is applied and a decremental period during which the second signal progressively attenuates.

5. The method as claimed in claim 4, wherein the decremental period is after the freeze period.

6. The method as claimed in claim 1, wherein the additional period of the braking phase is a predetermined duration.

7. The method as claimed in claim 1, wherein the additional period of the braking phase is a predetermined distance.

8. A device for delivering a torque setpoint signal to be applied to a wheel of a motor vehicle including an automated transmission, the torque setpoint signal including a static component and a dynamic component, formulated as a function of input data delivered by an input block, the input data including a recorded list of predetermined input parameters representative of a desire of a driver, of a state of the motor vehicle, and of an environment of the motor vehicle, the device comprising:

a first block configured to calculate a dynamic component of raw torque;

a second block configured to calculate a static component of raw torque, the second block being connected to an output of the first block;

a block configured to adapt the static component of raw torque to a braking situation as a function of the list of predetermined input parameters, wherein the block to adapt the static component of raw torque comprises:

a module configured to construct a first step signal to maintain a correction in a braking phase, and a second signal to progressively attenuate the correction beyond the braking phase, a first mapping to deliver a weighting setpoint as a function of a speed of the motor vehicle, a second mapping to calculate a percentage of deviation between a maximum torque applicable to the wheels of the motor vehicle and the static component of raw torque, as a function of deceleration of the motor vehicle, and a plurality of blocks configured to compare and integrate the second signal to progressively attenuate the correction in the braking phase, with the list of predetermined input parameters, which includes signals representing the raw static torque component, the maximum torque applicable to the wheels of the motor vehicle, the speed of the motor vehicle, and the deceleration of the motor vehicle; and connections to deliver the torque setpoint signal to an optimization module to control the automated transmission.

9. The device as claimed in claim 8, wherein the progressive attenuation of the second signal is linear.

10. The device as claimed in claim 8, wherein the braking phase, during which the block adapts the static component of raw torque, includes a period during which a brake is applied by the driver and an additional period beyond the period during which the brake is applied.

11. The device as claimed in claim 10, wherein the second signal progressively attenuates the correction in the additional period of the braking phase beyond the period during which the brake is applied.

12. The device as claimed in claim 10, wherein the additional period of the braking phase includes a freeze period after the period during which the brake is applied and a decremental period during which the second signal progressively attenuates.

13. The device as claimed in claim 12, wherein the decremental period is after the freeze period.

14. The device as claimed in claim 10, wherein the additional period of the braking phase is a predetermined duration.

15. The device as claimed in claim 10, wherein the additional period of the braking phase is a predetermined distance.

* * * * *